United States Patent [19]

Davis et al.

[11] 4,248,197
[45] Feb. 3, 1981

[54] APPARATUS FOR REDUCING HYDROCARBON EMISSIONS IMPROVING EFFICIENCY OF VEHICLE INTERNAL COMBUSTION ENGINES

[76] Inventors: O. Thurston Davis, Rte. #1, P.O. Box 33; B. Thurman Davis, Rte. #1, P.O. Box 258, both of Dunlap, Tenn. 37327

[21] Appl. No.: 25,474

[22] Filed: Mar. 30, 1979

[51] Int. Cl.³ ........................................ F02M 31/00
[52] U.S. Cl. ................................................. 123/557
[58] Field of Search .......... 123/122 R, 122 E, 122 H, 123/122 D, 122 B, 122 A, 122 AA, 543, 541, 545, 547, 557

[56] References Cited
U.S. PATENT DOCUMENTS

| 2,788,779 | 4/1957 | Mengelkamp | 123/122 E |
| 3,986,486 | 10/1976 | Rabbiosi | 123/122 E |
| 4,072,138 | 2/1978 | Hawkins et al. | 123/122 E |

Primary Examiner—Harry N. Haroian

[57] ABSTRACT

An apparatus is disclosed for use in a vehicle with a carbureted internal combustion engine having a vacuum inlet port and a fuel inlet port connected to a source of fuel. A heat exchanger is provided having a tank means with an inlet and an outlet, the outlet being connected to the carburetor vacuum inlet and tube means extending through the tank connected intermediate the fuel inlet port and the source of fuel. A source of hot and cold air is connected to the inlet of the heat exchanger and a control means for regulating the amount of hot and cold air entering the inlet of the heat exchanger is also provided in accordance with the temperature of the fuel in the carburetor.

10 Claims, 5 Drawing Figures

APPARATUS FOR REDUCING HYDROCARBON EMISSIONS IMPROVING EFFICIENCY OF VEHICLE INTERNAL COMBUSTION ENGINES

BACKGROUND OF THE INVENTION

This invention relates to systems for reducing the hydrocarbon emissions and improving the efficiency of internal combustion engines. Numerous devices have been devised in recent years for reducing the hydrocarbon emissions of engines in an effort to make them comply with enacted Federal and States laws, however, such systems have, in many instances, severely affected the efficiency of the engine and its overall performance. Other devices are often costly, complex and require a great deal of maintenance or contain components which, in the case of catalytic exhaust converters, often operate at undesirably high temperatures.

It is therefore, the primary object of the present invention to provide a new device which is capable of substantially reducing the hydrocarbon content of internal combustion engine exhaust emissions while at the same time improving or at least maintaining the desired level of engine efficiency.

It is another object of the invention to provide a device which is attached to the carburetor of a vehicle engine to reduce the hydrocarbon emissions thereof by maintaining the temperature of the fuel in the carburetor at between 110 and 115 degrees Fahrenheit.

It is yet another object of the present invention to provide a device which uses no additional energy but makes use of what is wasted in the engine cooling and air conditioning systems.

It is a still further object of the invention to provide a device which can be adapted to engines in use without major modification of the structure of the engine and which is of relatively inexpensive and simple construction.

These together with other objects and advantages which will become subsequently apparent reside in the details of construction and operation as more fully hereinafter described and claimed, reference being had to the accompanying drawings forming a part hereof, wherein like characters of reference refer to like parts throughout the drawing.

DETAILED DESCRIPTION OF PREFERRED EMBODIMENT

Figure 1:
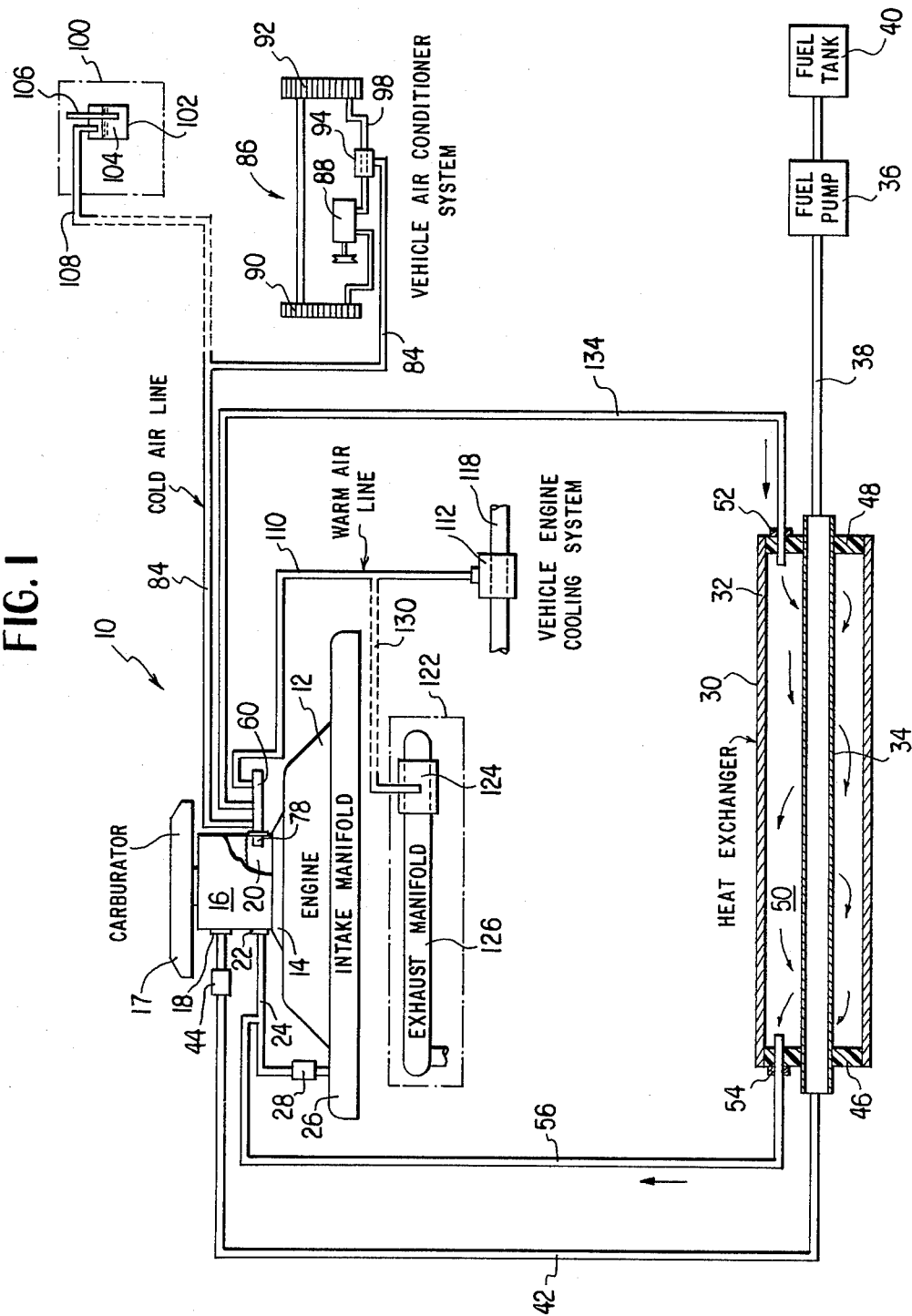
FIG. 1 is a diagrammatic illustration of the apparatus of the present invention attached to the internal combustion engine, cooling and air conditioning system of a vehicle.

In an embodiment of the invention chosen for the purpose of illustration, the apparatus indicated generally by numeral 10 is shown comprising an internal combustion engine 12 of an automobile or similar vehicle (not shown). The engine 12 has an intake manifold 14 upon which is mounted a carburetor 16. The carburetor 16 is of the conventional type having an inlet port 18 for connection to a source of fuel and a reservoir or bowl 20 containing an amount of fuel determined by a float actuated valve (not shown). The carburetor 16 also has a vacuum port 22 connected by line 24 to the valve cover 26 of the engine for drawing off engine generated gases and mixing them with the fuel mixture entering the engine for the combustion of same to further reduce pollution. A pressure-vacuum control valve 28 is provided in the line 24 to ensure that the suction in the line 24 is maintained at a predetermined level.

A heat exchanger 30 is provided having a cylindrical-shaped outer housing 32 concentric with a metallic tube 34, preferably copper. The tube 34 is connected at one end to a fuel pump 36 by line 38 which in turn is connected to a gas tank 40 for delivering fuel to the engine 12 in the conventional manner. The other end of the tube 34 is connected by line 42 to the fuel inlet port 18 of the carburetor via a pressure control valve 44 the function of which will be fully described later. Washer-shaped inserts 46, 48 of elastic material are provided at each end of the heat exchanger 30 between the outer housing 32 and the metallic tube 34 to seal and prevent air from entering or leaving the area 50. The heat exchanger 30 has an inlet port 52 extending through the washer insert 48 and an outlet port 54 extending through the washer insert 46. In practice, the outer housing 32 can be a length of hose having an internal diameter of between 0.5 or 0.625 inches which is positioned over the 0.25 inch diameter conventional copper fuel line. An overall length of the heat exchanger 30 of approximately 3.5 feet has found to be sufficient for effective heat transfer. The outlet port 52 is then connected by line 56 to the vacuum inlet port 22 of the carburetor 16 via line 24. As can be seen, air of a predetermined temperature entering inlet port 52 will be drawn by the vacuum in line 56 around the metallic tube 34 and out the outlet port 54 thereby bringing the temperature of the fuel passing through the metallic tube 34 to the temperature of the aforesaid predetermined temperature as will now be more fully discussed.

As is known, warm gasoline will vaporize better in the combustion chamber of an internal combustion engine resulting in a more complete burning thereof which in turn results in a cleaner burning with less pollutants in the exhaust in the form of unburned hydrocarbon particles and carbon monoxide. As is also known, as gasoline is heated to a temperature of between 110 and 115 degrees Fahrenheit, a vapor will form on the top of the gasoline at atmospheric pressure (14.7 pounds per square inch). Applicants have thus discovered that if the temperature of the gasoline can be maintained in the aforementioned range of between 110 and 115 degrees Fahrenheit before it is vaporized in the carburetor and if warmed air is added through the vacuum inlet port 22, the hydrocarbon emissions as well as carbon monoxide in the emitted exhaust can be substantially reduced. In addition, the efficiency of the engine in the form of a reduction in gasoline consumption can be realized with the use of the subject device particularly when the temperature of the gasoline in the tank 40 is very cold. For example, if the gasoline in the tank is approximately 40 degrees Fahrenheit and it is being delivered to the carburetor fuel inlet port 18 by the fuel pump 36 at between 5 and 7 pounds per square inch pressure, a certain quantity of gasoline will be consumed by the engine when it is operating at a certain speed under a specific load. When, however, the gasoline is heated in the heat exchanger 30 to between 110 and 115 degrees Fahrenheit, the gasoline expands raising the pressure to between 14 and 15 pounds per square inch with the net effect that the fuel pump 36 cannot pump as much fuel to the carburetor 16 at this elevated pressure as it can when the temperature of the gasoline is approximately 40 degrees Fahrenheit. The pressure control valve 44 serves to limit the pressure of the gasoline entering the bowl 20 to approximately 3.5 pounds per square inch. Elevated fuel pressure may override the float actuated valve (not shown), controlling the flow of fuel to the bowl 20 thus causing increased fuel consumption. If on the other hand, the temperature of the gasoline in the fuel tank 40 is between 95 and 115 degrees Fahrenheit, the temperature under the vehicle hood is in the neighborhood of 200 degrees Fahrenheit which in turn causes excessive vaporization of the gasoline. Such excessive vaporization also results in inefficient engine operation as well as the possibility of a "vapor lock" occurring in the fuel system. The subject device will in this instance, maintain the temperature of the gasoline in the aforementioned range of 110–115 Fahrenheit thus eliminating these problems.

Figure 2:
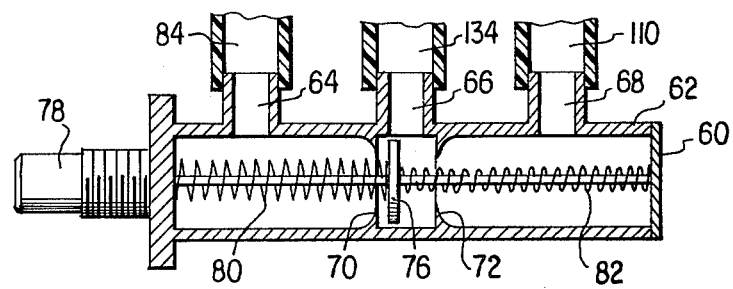
FIG. 2 is an enlarged elevational view in cross-section of the warm air generating device of the present invention.

The means for maintaining the temperature of the air entering the inlet port 52 of the heat exchanger 30 and thus the gasoline entering the fuel bow 20 constant, comprises a control valve 60 as can best be seen by referring to FIG. 2. The control valve 60 has a housing 62 with three ports 64, 66, and 68 communicating with the interior of the housing. Port 64 is connected to a source of cold air, port 68 is connected to a source of warm air and port 66 serves as an area for combining quantities of hot and cold air before it is delivered to inlet port 52 of heat exchanger 30 by means of line 134. First and second spaced-apart circular-shaped valve seats 70, 72, respectively, are formed in the interior of the housing on opposite sides of port 66 which are engaged by a valve head 76 as it is moved longitudinally to the right or left as viewed in FIG. 2. A threaded end 78 contains a heat responsive element such as spring 80 which is operatively connected to the valve head 76. The threaded end 78 is screwed into an aperture in the wall of carburetor 16 adjacent the fuel bowl 20 so that the temperature of the fuel in the bowl 20 is actually sensed and causes the element 80 to respond. A second smaller spring 82 is positioned on the other side of valve head 76 to keep it in engagement with valve seat 72 at temperatures below 110 degrees Fahrenheit. As the temperature of the fuel in the bowl 20 increases above 110 degrees Fahrenheit, the valve head 76 is gradually or correspondingly urged away from valve seat 70 toward valve seat 72. As can thus be seen, when the valve head is adjacent valve seat 72, only cold air flows from cold air port 64 through to exhaust port 66 to heat exchanger 30 to thereby cool the fuel in line 34 and subsequently in carburetor bowl 20. As the temperature of the fuel in bowl 20 thus decreases, heat responsive element 80 withdraws permitting valve head 76 to move to the left as viewed in FIG. 2 thus enabling warm air to enter warm air port 68 and mix with cool air. Thus, the fuel in bowl 20 will be maintained at the preselected temperature rating of heat responsive element 80, namely, 110 to 115 degrees Fahrenheit by means of the control valve 60 and the heat exchanger 30.

Figure 3:
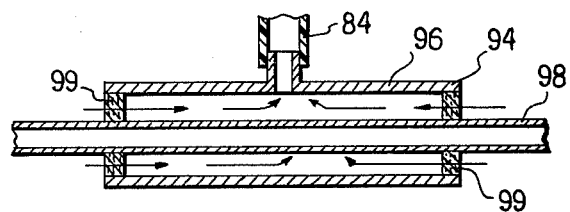
FIG. 3 is an enlarged elevational view in cross-section of the cold air generating device of the present invention.

The cold air inlet port 64 is connected by line 84 to, in one embodiment, the air conditioner system 86 consisting of the major elements of compressor 88, condenser coil 90 and evaporator coil 92 present in an ever increasing percentage of automotive vehicles. As can best be seen by referring to FIG. 3, the line 84 is connected to a heat exchanger 94 consisting of a cylindrical shaped outer housing 96, preferably made of metal, which is substantially concentric with a portion of the low pressure or suction line 98 leaving the evaporator 92 of the air conditioner system 86. The ends of the outer housing 96 are provided with washer-shaped discs 99 of filter material which discs serve to both position the outer housing 96 relative to the suction line 98 as well as filter out any particles in the air from being drawn into heat exchange relationship around suction line 98 as shown by arrows. The force for drawing the air into the heat exchanger 94 being, of course, provided by the vacuum at carburetor inlet port 22, transmitted via control valve 60. In the event the vehicle is not equipped with an air conditioning system, an alternative source of cool air can be provided by the device shown within phantom lines 100 which consists of a closed cannister 102 approximately two-thirds full of a fluid 104 such as water. An air pipe 106 extends from a position toward the bottom of the fluid through the cannister wall to the atmosphere. Another pipe 108, connected to cold air line 84, extends through the cannister wall to the open space above the fluid. Suction in line 84 causes air to be drawn from pipe 106 through the fluid where it is cooled and out pipe 108 to inlet pipe 64 of control valve 60 via line 84.

Figure 4:
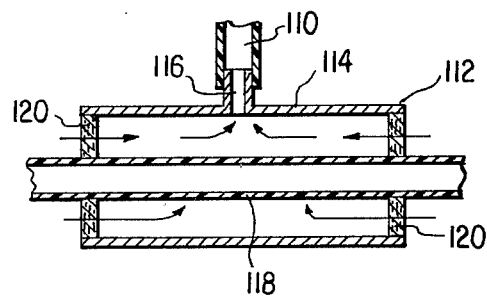
FIG. 4 is an enlarged elevational view in partial cross-section of an alternate warm air generating device of the present invention.
Figure 5:
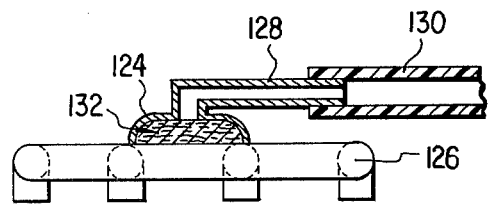
FIG. 5 is an elevational view of the temperature responsive control valve of the present invention.

The warm air inlet port 68 is connected by line 110 to, in one embodiment, a heat exchanger 112 as best seen by referring to FIG. 4. The heat exchanger 112 comprises a cylindrical shaped outer housing 114 preferably made of metal having a pipe 116 for connection to line 110. The housing 114 is substantially concentric with a section of hose 118 which carries heated water from the internal combustion engine back to the radiator of the vehicle cooling system (not shown). The ends of the outer housing 114 are provided with washer-shaped discs 120 of filter material which serves to filter the air passing therethrough in the same manner as the discs 99 of exchanger 94. The force for drawing the air into heat exchange relationship with heated hose 118, see arrows, is also provided by the vacuum at carburetor inlet port 22 transmitted via control valve 60. An alternative source of heated air can be provided by the device shown within phantom lines 122 which consists of a semi-circular shaped housing 124 made of metal connected to the exhaust manifold 126 of the internal combustion engine. The housing 124 has a length of metal pipe 128, preferably copper, connected thereto which in turn is connected to line 130 running to line 110. Heat from the exhaust manifold 126 is conducted into metal housing 124 and copper pipe 128 such that air drawn therethrough is heated. Filter material 132 of a heat resistant type is placed between the housing 124 and exhaust manifold 126 to filter air of particles etc. as it passes therethrough.

The cooled and heated air or a mixture thereof leaving exhaust port 68 of control valve 60 in response to the sensed temperature of the fuel in bowl 20 as previously discussed, is transmitted to inlet port 52 of heat exchanger 30 by means of line 134.

In a test of the system of the present invention in a 1971 Mark III Mercury automobile, without the system installed, the hydrocarbon emissions in the exhaust were tested to be 200 parts per million and carbon monoxide of 2 percent. After the system was installed and operating in the automobile, the hydrocarbon emissions were reduced to 100 parts per million and carbon monoxide to 0.5 percent.

Applicants have thus disclosed and now describe in detail their novel system for reducing hydrocarbon emissions in the exhaust of internal combustion engines as well as improving the operating efficiency thereof by maintaining the temperature of the fuel in the bowl of the engine carburetor at between 110 and 115 degrees Fahrenheit.

What we claim is:

1. In combination with a vehicle having an internal combustion engine and a carburetor with a vacuum inlet port and a fuel inlet port and a fuel system including a fuel tank and a fuel pump for delivering fuel from said fuel tank to said carburetor, including in combination:
   (a) a heat exchanger having a tank means with an inlet and an outlet, said outlet being connected to said vacuum inlet port of said carburetor and tube means extending through said tank means and connected intermediate said fuel inlet port of said carburetor and said fuel pump,
   (b) a source of hot and cold air connected to said inlet of said heat exchanger, and
   (c) control means for regulating the amount of said hot and cold air entering said inlet of said heat exchanger in accordance with the temperature of said fuel in said carburetor.

2. An apparatus as set forth in claim 1 wherein said control means further comprises temperature-responsive valve means interposed between said source of hot and cold air and said heat exchanger for varying the amount of said hot and cold air entering said inlet of said heat exchanger in accordance with the temperature of said fuel in said carburetor.

3. An apparatus as set forth in claim 2 wherein said carburetor has a fuel bowl and said control means further comprises a temperature detecting device connected to said valve means and extending into said fuel bowl of said carburetor to actually sense the temperature of the fuel in said carburetor.

4. An apparatus as set forth in claim 3 wherein said valve means has a first inlet connected to said source of hot air, a second inlet connected to said source of cold air, an outlet connected to said inlet of said heat exchanger and a valve head for controlling the amount of hot and cold air exiting said outlet.

5. An apparatus as set forth in claim 3 wherein said valve means comprises first and second oppositely disposed valve seats adjacent said outlet, one of said valve seats controlling air from said source of hot air and the other of said valve seats controlling air from said source of cold air, and said valve head being movable from said first valve seat to said second valve seat by means of said temperature detecting device to control thereby the respective amounts of hot and cold air entering said outlet.

6. An apparatus as set forth in claim 1 wherein said vehicle also has an air conditioning system comprising a compressor driven by said internal combustion engine for circulating refrigerant to a condenser coil and an evaporator coil and for withdrawing said refrigerant from said evaporator coil through a suction line back to said compressor, and said source of cold air is drawn from around said suction line.

7. An apparatus as set forth in claim 1 wherein said internal combustion engine has an exhaust manifold and said source of hot air is air drawn from around said exhaust manifold.

8. An apparatus as set forth in claim 1 wherein said source of cold air is air drawn through a liquid in a container.

9. An apparatus as set forth in claim 1 wherein said control means maintains said fuel entering said internal combustion engine from said carburetor at between 110–115 degrees Fahrenheit.

10. An apparatus as set forth in claim 1 further comprising pressure control valve means interposed between said fuel inlet port of said carburetor and said outlet of said heat exchanger.

* * * * *